UNITED STATES PATENT OFFICE 2,179,209

ESTERS DERIVED FROM ISOCYCLIC COMPOUNDS

Karl Daimler and Carl Platz, Frankfort-on-the-Main, Germany, assignors to I. G. Farbenindustrie Aktiengesellschaft, Frankfort-on-the-Main, Germany No Drawing. Application July 16, 1937, Serial No. 154,011. In Germany April 11, 1936

3 Claims. (Cl. 260—473)

The present invention relates to esters derived from isocyclic compounds; more particularly, it relates to technically valuable esters manufactured by causing isocyclic compounds which contain in the aromatic or cycloaliphatic nucleus at least one aliphatic or cycloaliphatic substituent having at least 3 carbon atoms and which contain carboxyl groups bound directly to the ring or separated therefrom by an aliphatic radical or derivatives or salts of such compounds, to react with a hydroxylated or halogenated aliphatic or isocyclic sulfonic acid or sulfuric acid ester or salt thereof.

These esters have a strong capillary action and capacity for diminishing surface tension and may, therefore, be used in the form of their water-soluble salts, especially their alkali salts, with advantage as agents of capillary action (wetting, washing, cleansing and dispersing agents), if desired, with addition of the adjuvants usually applied in the preparation of washing and auxiliary agents in the textile industry.

Among suitable aromatic or cyclo-aliphatic carboxylic acids there may be mentioned compounds the carboxyl group of which is directly bound to the nucleus, such as isopropyl-benzoic acids, butylbenzoic acids, isooctylbenzoic acids, perhydronaphthoic acids, perhydrobenzoylbenzoic acid, butylphthalic acid, the perhydration products of the condensation product from phthalic anhydride and naphthalene; there may further be used compounds the carboxyl group of which is present at an aliphatic radical bound to the nucleus by way of an oxygen atom, for instance, isooctylphenoxy-acetic acid, isododecylphenoxy-acetic acid, dibutylphenoxy-acetic acid, isooctylphenoxypropionic acid, isooctylphenoxy-butyric acid, isooctylphenoxy-valeric acid, isooctylnaphthoxy-acetic acid, isooctylnaphthoxy-propionic acid, dibutyl-isooctyl-benzoic acid, di-isohexyl-benzoic acid, tri-isobutyl-phenoxy-acetic acid.

Examples of the aliphatic or isocyclic sulfonic acids or sulfuric acid esters containing hydroxyl groups are: hydroxy-ethane-sulfonic acid, 2- or 3-hydroxy-propane-sulfonic acid-(1), 2,3-dihydroxypropane-sulfonic acid-(1), hydroxy-butane-disulfonic acids, phenol-sulfonic acids, cellulose-sulfuric acid esters, glycerol-mono-sulfuric acid esters, cyclohexanol-sulfonic acids, 6-hydroxy-hexane-sulfonic acid-(1), hydroxyethyl-oxethane-sulfonic acid (HO—CH$_2$—CH$_2$—O—CH$_2$—CH$_2$—SO$_3$H), further ethionic acid and carbyl sulfate. There may likewise be used the corresponding compounds in which one hydroxyl group is exchanged for halogen, for instance, chlorethane-sulfonic acid, chloro-hydroxy-propane-sulfonic acid or bromo-hydroxypropane-sulfonic acid, chloro-butane-disulfonic acid.

For the reaction with halogenated aliphatic or isocyclic sulfonic acids or sulfuric acid esters, there are used the salts of the substituted isocyclic compounds, for instance their alkali salts. On the other hand, there are used, for the reaction with the corresponding hydroxylated compounds, the substituted isocyclic compounds in the form of their acid chlorides. In the case of ethionic acid or carbyl sulfate or of the free hydroxy-alkyl-sulfonic acids, the free carboxylic acids may be used.

The water-soluble metal salts of the ester may be applied in various ways as agents of capillary action. For instance, the sodium salts may be used as wetting agents, kier boiling agents, fulling agents, agents for washing wool and fine laundry goods; furthermore, as hair wash since they are distinguished by a good foaming and very good cleansing power. For washing white goods, for instance, they may be used together with pyrophosphate whereby especially good effects may be obtained and there may also be added substances yielding oxygen, stabilizing agents and other additions.

Among inorganic salts the following are mentioned: sodium sulfate, sodium carbonate, alkali salts of ortho-, meta- or pyrophosphoric acid; substances yielding oxygen are, for instance: sodium perborate, sodium perpyro-phosphate; stabilizing agents suitable for use in the present invention are magnesium salts, such as magnesium sulfate, magnesium silicate. The products may also be used in admixture with organic solvents, for instance, with butyl alcohol, benzyl alcohol, monobutyl-glycol, xylenyl-glycol, chloroform, ethylene chloride and trichlorethylene.

The substances obtainable according to this invention may be used also in conjunction with other substances of capillary action whereby special effects, for instance, an enhanced foaming power, may be obtained to an unexpected extent. Such substances are, for instance, Turkey red oil, alkylated naphthalene-sulfonic acids, condensation products from fatty acids and taurines, condensation products obtained from the carboxylic acids used in the present process and taurines, sulfonation products from aliphatic or cycloaliphatic alcohols of high molecular weight, furthermore, the products obtained by causing alkylene oxides to act upon organic compounds containing reactive hydrogen atoms and the products of their reaction with inorganic or organic acids.

The following examples serve to illustrate the invention, but they are not intended to limit it thereto; the parts are by weight, unless otherwise stated:

1. 1 mol. of isooctylphenoxy-acetic acid chloride is stirred with 1 mol. of the sodium salt of the hydroxyethane-sulfonic acid and the whole is heated for about 2 hours at 90° C. After cooling, the product is pulverized.

An agent for washing white goods is prepared by mixing

|   | Parts |
|---|---|
| The above-described product | 9 |
| Water-glass of 100 per cent. strength | 5 |
| Calcined sodium pyrophosphate | 13 |
| Crystallized sodium perborate | 7 |
| Magnesium sulfate | 2 |
| Calcined sodium carbonate | 32 |
| Sodium sulfate | 23 |
| Water | 9 |

For washing white goods in a washing machine there are used for 1 kilo of dry goods 3 liters of water in which there are dissolved per liter of water 8 grams of the washing powder prepared according to the above prescription. The goods are soaked as usual and introduced into the cold washing solution, heated to boiling and boiled for ½ hour, rinsed hot and rinsed cold, then dried in the usual manner and ironed. The foaming and washing effect is as good as that obtained with the same quantity of a commercial self-acting washing agent.

2. 1 mol. of isododecylphenoxy-acetic acid is transformed into the chloride which is caused to react at about 90° C.–120° C. with 1 mol. of an anhydrous sodium salt of a phenol-sulfonic acid.

An agent for washing white goods is obtained by mixing together

|   | Parts |
|---|---|
| The product above described, in a pulverized state | 3 |
| The reaction product of dodecylphenol with 13 mols. of ethylene oxide | 6 |
| Water-glass of 100 per cent. strength | 5 |
| Calcined sodium pyrophosphate | 13 |
| Crystallized sodium perborate | 7 |
| Magnesium sulfate | 2 |
| Calcined sodium carbonate | 32 |
| Sodium sulfate | 23 |
| Water | 9 |

This agent for washing white goods is used in the manner described in Example 1 and yields a similarly good effect.

3. 1 mol. of dibutylphenoxy-acetic acid chloride is stirred with 1 mol. of the sodium salt of the hydroxy-ethane-sulfonic acid and the mixture is heated for 2 hours at about 90° C. The product has valuable properties as auxiliary agent in the textile industry and as washing agent.

4. 141 parts of isooctylphenoxy-acetic acid chloride and 100 parts of the sodium salt of the hydroxy-ethane-sulfonic acid (95 per cent. strength) are mixed and reaction is brought about in a vessel which has been heated to 95° C.–100° C. and is provided with a strong stirrer. With intense evolution of hydrogen chloride the esterification of the hydroxy-ethane-sulfonic acid occurs within 2–3 hours, first at 95° C.–100° C. and then at 100° C.–110° C. The cold product is pulverized and rendered neutral by means of calcined sodium carbonate. The reaction only succeeds if the sodium salt of the hydroxy-ethane-sulfonic acid is absolutely dry and as finely powdered as possible.

The product which may be supposed to have the following constitution:

$$C_8H_{17}.C_6H_4.OCH_2.COO.CH_2.CH_2.SO_3Na$$

is easily soluble in water, is stable to the action of lime and has a high wetting, emulsifying and washing action.

5. 300 parts of para-dodecyl-benzoic acid chloride are mixed with 180 parts of potassium oxethane-sulfonate and condensation is conducted as described in Example 4:

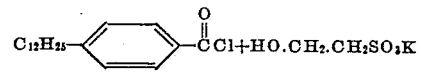

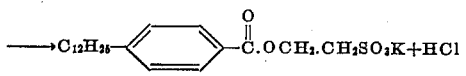

The potassium dodecyl-benzoyloxethane-sulfonate easily dissolves in warm water and is suitable for use as levelling and through-dyeing agent.

6. 242 parts of per-hydrobenzoyl-benzoic acid chloride are condensed, in the manner indicated in Example 4, with 240 parts of potassium 6-hydroxy-hexane-sulfonate:

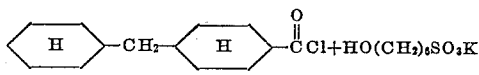

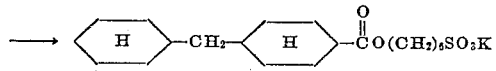

The potassium salt of the para-perhydrobenzoyl-benzoic acid ester of the hydroxy-hexane-sulfonic acid is suitable for use as dispersing agent.

7. Within the course of ¼ hour, 25 parts of ethionic acid are added, drop by drop at a temperature of 20° C.–30° C., to 35 parts of tetradecyl-phenoxy-acetic acid; the whole is then further stirred, for 3 hours, at the indicated temperature. A product is obtained which dissolves in warm water to a clear solution. At temperatures below 10° C., the product is treated with ice and sodium carbonate and rendered feebly alkaline to litmus. Thereupon, the paste formed is made up to 141 parts. A product is thus obtained which consists, as to one third, of the sodium salt of the ester from tetradecylphenoxy-acetic acid and oxethane-sulfonic acid:

$$C_{14}H_{29}.C_6H_4.O.CH_2.COO.C_2.H_4.SO_3Na$$

The product is suitable for being used as washing agent having a strong foaming power.

8. The carboxylic acid obtained by condensing phthalic anhydride with naphthalene by the Friedel-Crafts reaction, is transformed by catalytic hydrogenation into the perhydro-compound and then converted into the acid chloride by causing it to react with phosphorus trichloride. 74 parts of this acid chloride are mixed in a sufficiently large reaction vessel with 47 parts of sodium hydroxy-ethane-sulfonate. The vessel is then put in an oil bath pre-heated to 125° C. and the mass is stirred until the theoretical amount by weight of hydrochloric acid gas has been evolved and the mass dissolves in warm water to a clear solution; it is then neutralized by means of calcined sodium carbonate; the crude product may, for instance, be used as washing agent or it may be purified by extracting it with acetone and recrystallizing from ethyl alcohol.

We claim:

1. The products of the general formula $$(R_1)_n-A-OR_2-COY$$

wherein $R_1$ is a member of the group consisting of aliphatic and cycloaliphatic hydrocarbon radicals having at least three carbon atoms, $n$ is a whole number from 1 to 3, A is an isocyclic ring system selected from the group consisting of hydrogenated and non-hydrogenated benzene and naphthalene radicals, $R_2$ is a member selected from the class consisting of aliphatic hydrocarbon radicals, and Y represents $-OR_3-SO_3H$, $R_3$ standing for a member selected from the group consisting of aliphatic, cycloaliphatic and aromatic radicals.

2. The iso-octylphenoxy-acetic acid ester of hydroxy-ethane-sulfonic acid having the formula:

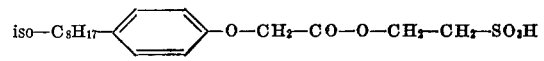

3. The tetradecylphenoxy-acetic acid ester of hydroxy-ethane-sulfonic acid having the formula:

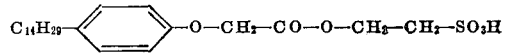

KARL DAIMLER.
CARL PLATZ.